United States Patent [19]

Oheda et al.

[11] Patent Number: 5,400,243
[45] Date of Patent: Mar. 21, 1995

[54] METHOD OF CORRECTING PRINT DATA AND SYSTEM OF EDITING AND PRINTING DOCUMENTS

[75] Inventors: Shigeto Oheda, Kamakura; Kazuhide Nishiyama; Hiroshi Abei, both of Yokohama, all of Japan

[73] Assignee: Hitachi, Ltd., Tokyo, Japan

[21] Appl. No.: 797,897

[22] Filed: Nov. 26, 1991

[30] Foreign Application Priority Data

Nov. 28, 1990 [JP] Japan ................. 2-322982

[51] Int. Cl.⁶ .............................. G06F 1/00
[52] U.S. Cl. ................... 364/419.17; 364/419.14; 395/117; 395/146; 358/452
[58] Field of Search ............. 364/419, 419.1, 419.14, 364/419.17; 395/144, 145, 146, 113, 114, 117; 358/452

[56] References Cited

U.S. PATENT DOCUMENTS

| 4,858,171 | 8/1989 | Furusawa et al. | 364/419.1 |
| 4,898,483 | 2/1990 | Iizuka | 395/112 |
| 4,914,621 | 4/1990 | Mashiyama | 395/117 |
| 5,164,842 | 11/1992 | Gauronski et al. | 358/401 |
| 5,170,397 | 12/1992 | Hurtz et al. | 371/16.4 |

FOREIGN PATENT DOCUMENTS 59-188453 10/1984 Japan.
61-267124 11/1986 Japan.
1-21528 1/1989 Japan.

OTHER PUBLICATIONS

WordPerfect version 4.2, copyright 1986, pp. R109–R126.
Automated Patent System, May 29, 1990, pp. 5-2 through 5-13.

Primary Examiner—Gail O. Hayes
Assistant Examiner—J. L. Hazard
Attorney, Agent, or Firm—Antonelli, Terry, Stout & Kraus

[57] ABSTRACT

The present invention relates to a document editing and a printing apparatus comprising a data processor such as a personal computer and a word processor, and more particularly to a method of correcting data to be printed. The object of the present invention is to provide a printed data correcting method capable of correcting an error in a printed document during printing without terminating the printing when such error is found. In order to achieve the object, according to the present invention, data involving printing is displayed to the user. Each data is stored which is indicative of whether data of a specified unit such as a character, a line or a page are printed or print-waiting such that the data stored as being print-waiting can be corrected. When the data stored as being already printed are corrected, only the page which contains the corrected data is reprinted.

20 Claims, 14 Drawing Sheets

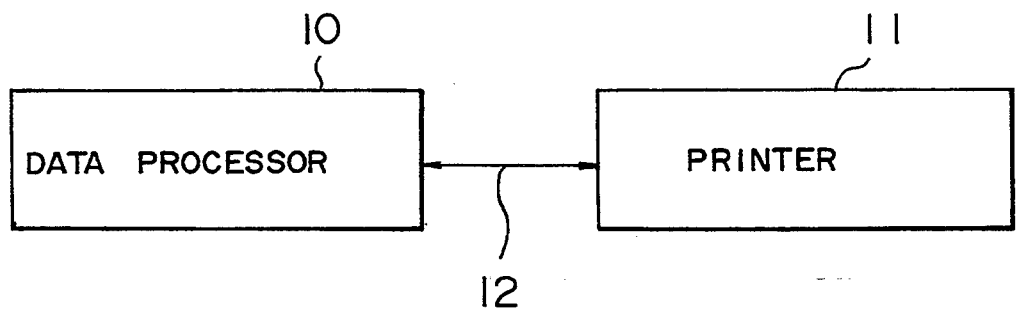
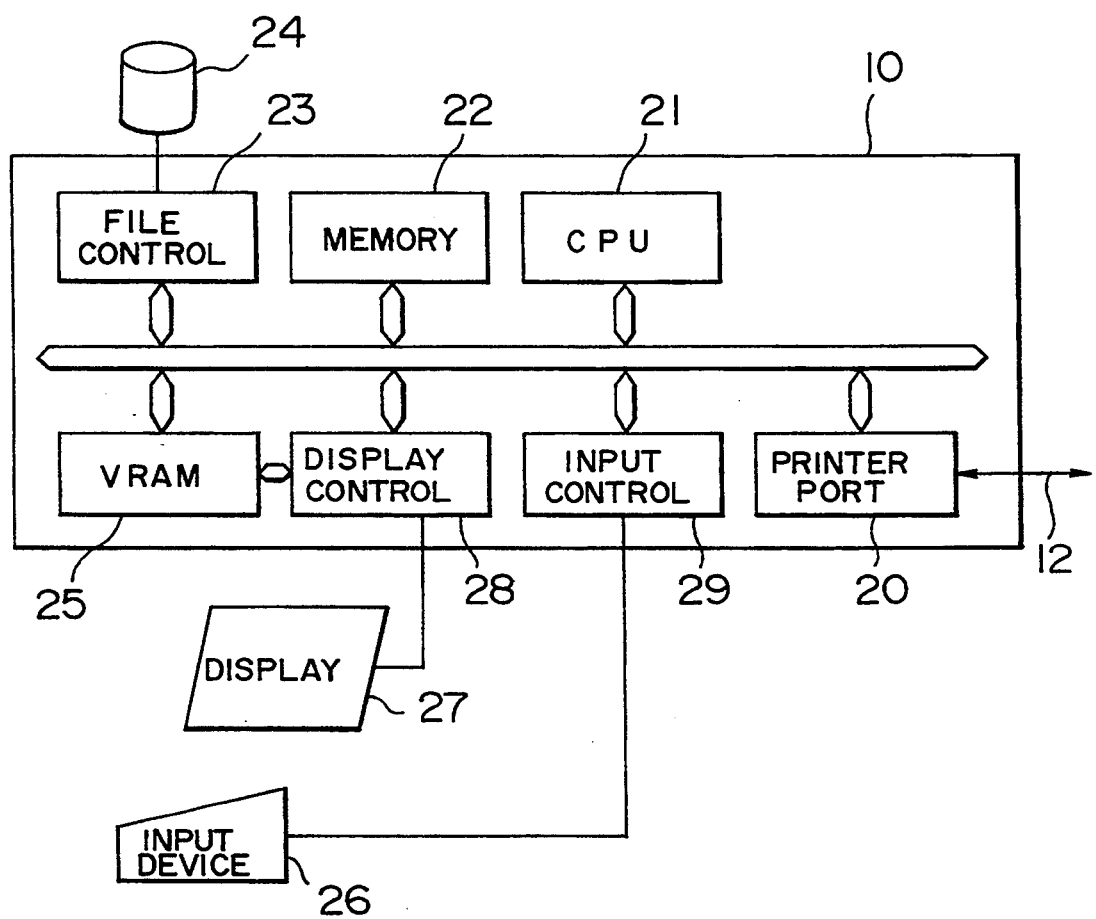

| 1 | I | Mr. Naohiko Kume ⏎ |
| 2 | I | 3422 Kitami-cho, ⏎ |
| 3 | O | Setagaya-ku, Tokyo ⏎ |
| 4 | O | Dear Mr. Kume ⏎ |
| 5 | O | Thank you for your interest in Doting, by Henry ⏎ |
| 6 | O | Green. ⏎ |
| 7 | O | The translation rights in this book are being negoti- ⏎ |
| 8 | O | ated by the agencies listed below and I have accordingly ⏎ |

FIG. 18

Thank you for your interest in Doting, by Henry Green.

The translation rights in this book are being negotiated by the agencies listed below and I have accordingly forwarded your inquiry to them.

Sincerely yours,

Ethel Pushkoff

Ethel Pushkoff

FIG. 19

Mr. Noriko Kume
3422 Kitami-cho
Setagaya-ku, Tokyo

Dear Mr. kume:

Thank you for your interest in Doting, by Henry Green.

The translation rights in this book are being negotiated by the agencies listed below and I have accordingly forwarded your inquiry to them.

METHOD OF CORRECTING PRINT DATA AND SYSTEM OF EDITING AND PRINTING DOCUMENTS

BACKGROUND OF THE INVENTION

The present invention relates to document editing and printing systems comprising a data processor such as a personal computer or a word processor and a printer, and more particularly to methods of correcting data to be printed.

Conventionally, there is a technique which is employed for coping with the appearance of data to be corrected in a document under printing, as disclosed in Japanese Patent Applications JP-A-64-21528 and 61-267124. The technique includes monitoring during printing whether there is a user's request to stop printing, stopping printing at the request and enabling interruption of other operations, and then reprinting the document. In addition, in order to monitor a document under printing, that portion of the document where printing is stopped is displayed on a display as well as on a paper, as disclosed in JP-A-59-188453.

In any of these techniques, it is not considered for correction of data itself under printing. If data are to be corrected in the document, print is immediately terminated, the document is corrected in a document edition process and the document is printed again from the beginning. Thus, the user's operation is complicated.

It is a first object of the present invention to provide a print data correcting method which is capable of correcting print data during printing without terminating the printing.

It is a second object of the present invention to provide a print data correcting method which efficiently displays correctable (print-waiting) data and uncorrectable (already printed) data when the print data are corrected.

It is a third object of the present invention to provide a print data correcting method which displays correctable print data distinctively from uncorrectable print data.

It is a fourth object of the present invention to provide a print data correcting method which is capable of correcting data even if print data cover a plurality of lines.

It is a fifth object of the present invention to provide a print data correcting method which is capable of correcting all print data during printing by effectively using print data printed so far.

It is a sixth object of the present invention to provide a print data correcting method which is capable of correcting print data even if it is used with a printer having a built-in buffer in which the timing of receiving print data differs from the timing of printing the received data.

SUMMARY OF THE INVENTION

In order to achieve the first object, according to the present invention, print data are displayed for the user, a print flag indicative of after/before printing is stored for each print data in a specified unit such as a character, a line or a page, and the data stored with print flags indicating before printing can be corrected.

In order to achieve the second object, according to the present invention, print data are sequentially displayed for the user at a fixed timing corresponding to a progress of printing, a print flag indicative of after/before printing is stored for each data of the specified unit and the data stored with the print flags indicating before printing can be corrected.

In order to achieve the third object, according to the present invention, the data with the print flags indicating before printing are displayed distinctively from the data with the print flags indicating after printing, and the user accesses only the former data which accept a correction operation.

In order to achieve the fourth object, according to the present invention, when there are print data covering a plurality of units such as an enlarged character or ruled lines, link data of the print data included in the units are stored. When the first unit datum with the link data is printed, the entire print data included in the units is handled as being printed.

In order to achieve the fifth object, according to the present invention, both printed data and print-waiting data are allowed to be corrected. When the printed data are corrected, only the pages on which the corrected data has been printed are reprinted.

In order to achieve the sixth object, according to the present invention, the printer delivers the data processor reception completion signals when print data with a specific unit are received, and print completion signals when the print data with the specific unit has been printed.

In a preferred embodiment, a print flag is stored for each specified printing unit, for example, of a character, a line or a page, and the flag indicates that the print data with the specified unit are already printed or waiting for print. In a correcting process for adding, deleting or changing print data, the print flag is referred to and correction is allowed only on the print data which are recognized through the print flag as waiting for print. Thus, the user can correct print-waiting data even during printing and operability is improved.

The progress of printing is estimated with the print flag, and print data before and after a point where the print flag changes from before printing state to after printing state are displayed for the user. Thus, the data under printing at present are displayed at all times, so that the user can easily confirm print-waiting data, and hence the convenience of using the system for the user is improved. If display is made in advanced or delayed in synchronism with a current printing point in accordance with the progress of printing, the user can confirm print-waiting data with a leeway, thereby improving convenience of using the system.

A print flag stored in a print flag memory is recognized, and printed data and print-waiting data are displayed distinguishably from each other by displaying the printed data in hatching, for example. Thus, the user can recognize print-waiting data by viewing the display, so that the convenience of using the system for the user is improved.

Link data indicating that print data consist of a plurality of units like a double-sized character data are stored with the print data. When the print flag changes, the link data is checked. If the print data have link data, when the print flag for the first one of a plurality of data having the link data is changed from a print-waiting state to a printed state, all the print flags linked with the link data are changed simultaneously from print-waiting states to printed states. Thus, correction of print data such as of a double-sized character or ruled lines to be printed over a plurality of units is inhibited at printing of the leading unit of the data, so that difficulties such as a deformation of print data are avoided and reliability is improved.

If correction of print data is allowed, when the print flag indicates that the print data have been printed, all or a part of the printed data are printed again after correction. When the print flag indicates a print-waiting state, printing continues from the interrupted point after correction without further printing the printed data. That is, the user can correct all the printed data and print-waiting data. In addition, when printing is restarted after the correction, the user can use the printed data efficiently and save paper resources.

When a built-in buffer is used in the printer, the printer monitors and detects the specified units and specified characters and communicates them to the data processor. Thus, the printing state can be confirmed even in such a printer with a memory as a printing buffer for storing print data that has delays between the timing of receiving print data and the timing of printing the data.

BRIEF DESCRIPTION OF THE DRAWINGS

FIG. 1 shows the overall structure of a document editing and printing system of the invention.

FIG. 2 shows the detailed structure of the data processor 10 of FIG. 1.

FIG. 18 shows one example of printed data displayed on a screen of display 27.

FIG. 19 shows another example of printed data displayed on the screen of display 27.

DESCRIPTION OF THE PREFERRED EMBODIMENTS

Figures 3, 4:
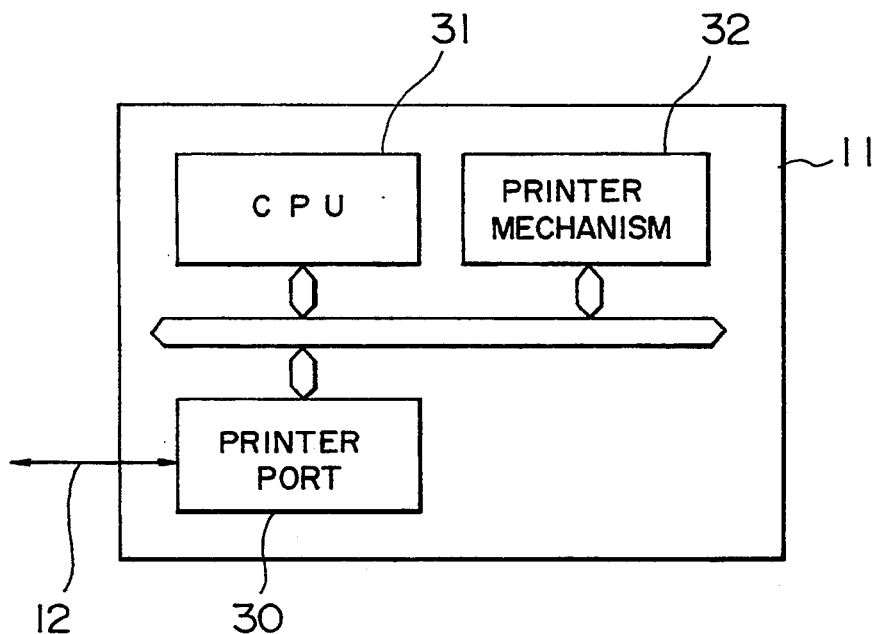
FIG. 3 shows the detailed structure of the printer 11 of FIG. 1.
FIG. 4 shows one example of print data handled in the present invention.

A first embodiment of the present invention will be described. FIG. 1 shows the structure of a data processing apparatus according to the present invention. In FIG. 1, the numeral 10 denotes a data processor such as a personal computer or a word processor; 11, a printer such as a line printer or a page printer; and 12, a data transmission line through which print data are delivered from the data processor and transmission of print data is controlled.

FIG. 2 shows the structure of data processor 10. In FIG. 2, the numeral 20 denotes a printer port which is connected to the printer 11 through the data line 12 for transmission and reception of data; 21, a central control unit (CPU) which controls the entire data processor; 22, a memory comprising, for example, a ROM which stores fixed data to be read only such as a program for controlling the CPU 21 or a RAM which stores renewable data such as for a work area of the program; 24, a secondary storage such as a floppy disc or a hard disc; 23, a file control unit which controls writing data into and reading data from the secondary storage 24; 25, a VRAM (a video RAM) or a display memory which stores display data of characters or figures to be displayed on a display 27; 26, an input device such as a keyboard or mouse; 27, a display device such as a CRT or a liquid crystal display; 28, a display control unit makes the display device 27 display with data stored in the VRAM 25; and 29, an input control unit which controls the input device 26.

FIG. 3 illustrates a schematic construction of the printer 11. In FIG. 3, the numeral 30 denotes a printer port which controls the reception of data to be printed and transmitted by the data processor 10; 31, a CPU which controls the entire printer 11; and 32, a printer mechanism which performs printing and paper feeding.

FIG. 4 shows print data and control data for the print data. In FIG. 4, the numeral 40 denotes a print flag which bears information of printed data ("1") and print-waiting data ("0"); and 41, print data to be printed. The print flag 40 is stored in a print flag storage region which is specified in the memory 22 or the secondary storage 24. The print data 41 is stored in the memory 22 or the secondary storage 24.

Figure 5:
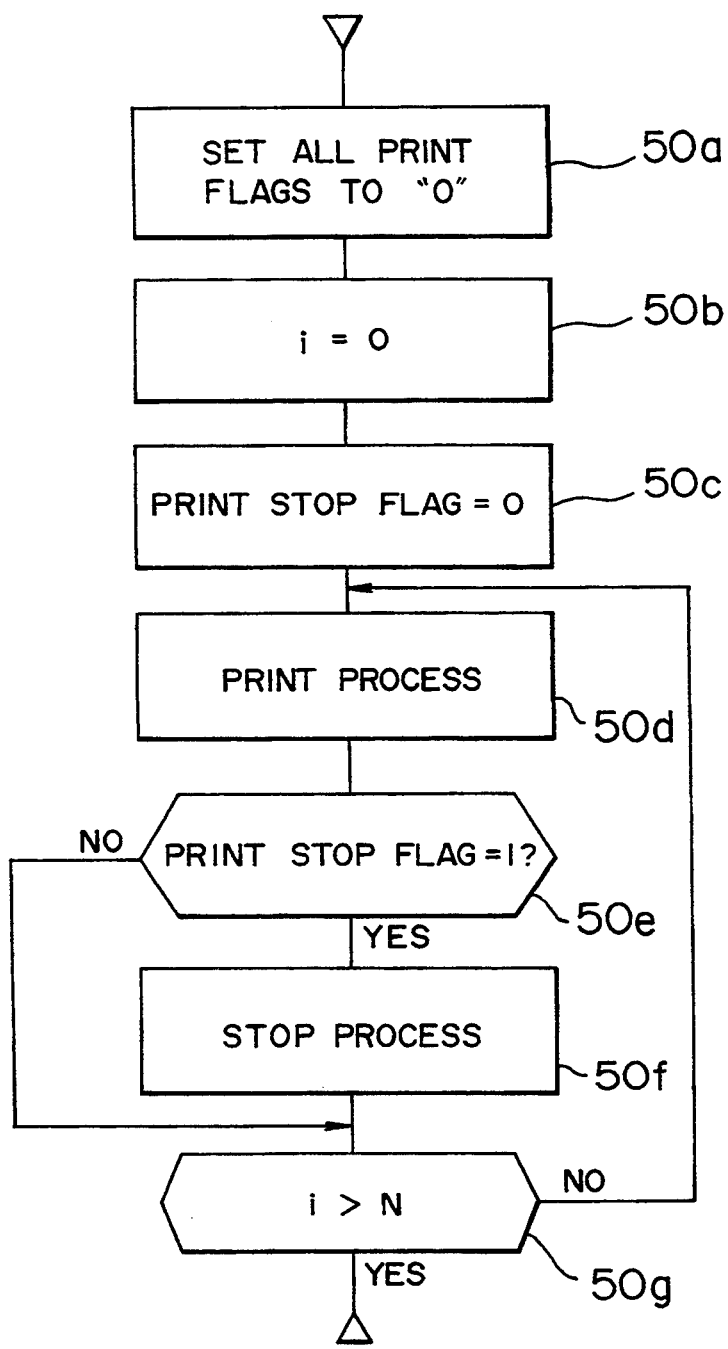
FIG. 5 illustrates a main flow of a print data correcting method executed in CPU 21 of FIG. 2 according to the first to fourth embodiments of the present invention.

FIG. 5 shows the main flow of a printing program. The program is stored in the memory 22 and executed by the CPU 21.

Figure 6:
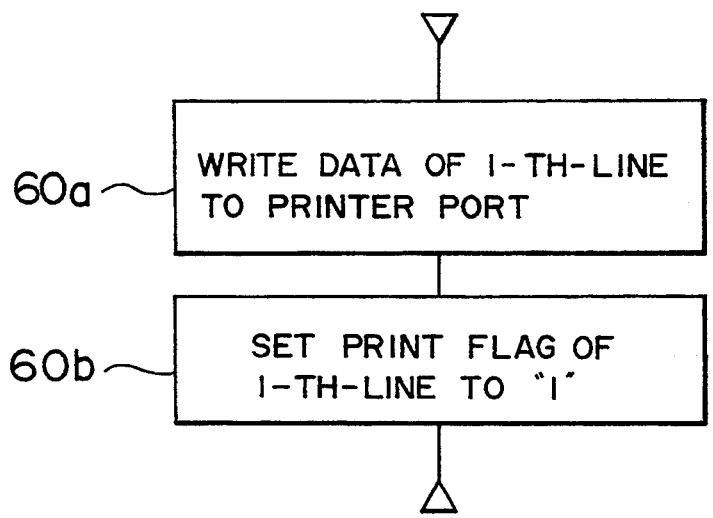
FIG. 6 illustrates a detailed flow of printing process 50d of FIG. 5 in the first, third and fifth embodiments of the present invention.
Figure 7:
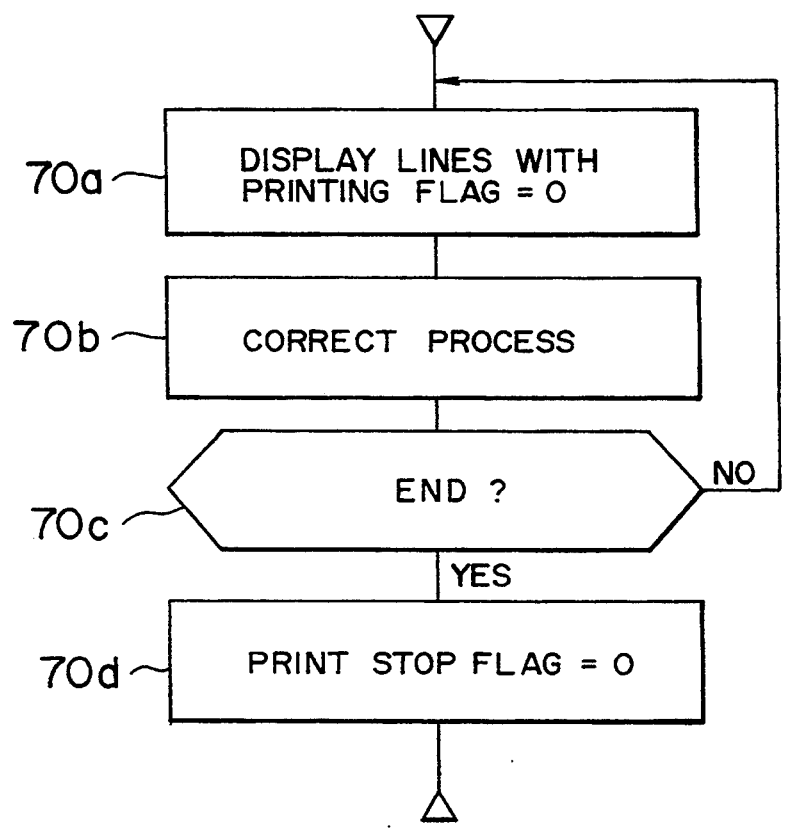
FIG. 7 illustrates a detailed flow of stop process 50f of FIG. 5 in the first and fourth embodiments.
Figure 8:
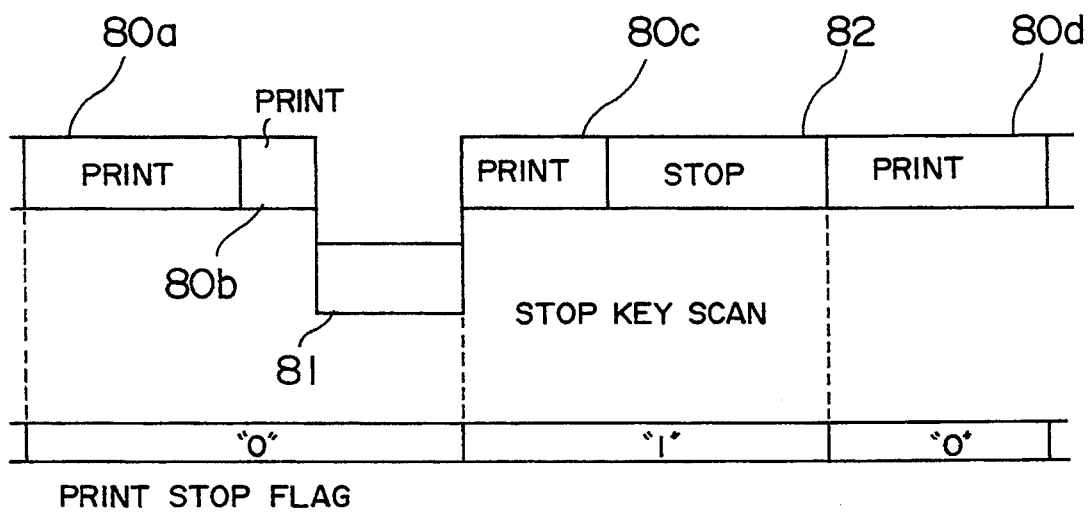
FIG. 8 is a timing chart indicating the process for interrupting printing in the first embodiment.

FIG. 6 shows a more detailed flow of the printing process 50d of the printing program (FIG. 5). FIG. 7 shows a more detailed flow of the stop process 50f of the printing program (FIG. 5). FIG. 8 shows a timing chart around print stop.

The operation of the embodiment will be described in reference to FIG. 1. The data processor 10 has function of generating and correcting data of characters (sentences) or figures, and delivering the resultant data of characters or figures through the data line 12 to the printer 11. The data processor 10 may be an information device such as a personal computer, word processor or work station. The printer 11 processes received data to be printed, and controls a mechanism of as a line printer or a page printer to print the data. The entire printing operation is controlled by the data processor 10 controlling the print data. In FIG. 2, a program for a specified application such as a word processing program is stored in the memory 22, and the CPU 21 executes this program. During the program execution, the CPU 21 receives the data through a keyboard of the input device 26, processes the received data as character or figure data, and writes the result of the processing into the memory 22 or the secondary storage 24 such as a hard disc. The CPU 21 develops the character or figure data into dot data for display so that the user can recognize those data on the display 27, and writes the dot data into the display memory (VRAM) 5. For printing, the CPU 21 writes the data of character and figure as print data into the printer port 20, which delivers the data through the data line 12 to the printer 11. In FIG. 3, the data received from the printer port 30 are printed by the printer mechanism 32 under control of the CPU 31.

The printing operation by the CPU 21 will be described with reference to FIG. 5. When printing starts, all the print flags stored in the print flag storage region, for example, in the memory 22 are set to "0" (represents a print-waiting state) (50a). A parameter i indicating a quantity of printed data is set to "0" (50b). The parameter i is a variable which counts printed data with a specified unit (printing unit) such as a line or a page. A print stop flag is initialized to "0" (50c). The print stop flag indicates the presence of user's instruction to stop the print, that is, "0" indicates no instruction of print stop while "1" indicates the presence of the instruction. Print is then performed in a unit of print data (50d). It is determined whether a print stop instruction is generated by the user through the operation of the input device 26 (50e). When a print stop instruction is generated, print is stopped (50f). When the parameter i of printed data exceeds an expected value N, the print is terminated. If the parameter i does not exceed the value N, the control returns to process 50d to continue printing (50g). N is a variable indicative of a predetermined quantity of print.

FIG. 6 shows the details of print process 50d. In the present embodiment, a line is specified as the printing unit. The print data are written into the printer port 20 (60a). The print flags corresponding to the line whose print data are output to the printer port 20 in step 60a are set to "1" (completion of print) (60b).

FIG. 7 shows the details of stop process 50f. The print data are checked and print-waiting lines are displayed (70a). The user performs a correcting operation such as addition, change and deletion on the print-waiting data by operating the input device 26 (70b). It is then determined whether the correction has been completed (70c). If the processing is terminated, then the print stop flag is reset to "0" (70d).

FIG. 18 shows one example of the displayed data on the screen of the display 27. The displayed data are print-waiting data only. The user performs an ordinary editing operation on these data to correct them.

FIG. 8 is a timing chart indicative of the process at print stop. In an ordinary printing state, printing process 80 is repeated until print ends. When a request for stopping print is provided by the user through the input device 26, printing process 80b is interrupted and stop key scanning process 81 is started by interrupt control. In process 81, a print stop flag is set to "1" (indicative of print stop) and print process 80c is then restarted. After print process 80c is terminated, print stop flag is checked at step 50e and stop process 82 is started in accordance with the result. When stop process 82 is terminated, process 70d is started to thereby return the print stop flag to "0".

Application of the processing shown in FIG. 5 to the data in FIG. 4 will be described. First, the print flags 40 are all set to "0" (50a). Data 41 in the first line are printed (50d). The print flag 40 corresponding to the first line is set to "1" (completion of print) (60b). The above processing is repeated on data 41 line by line. FIG. 4 shows that the data up to the second line have been printed (print flag=1) and the data in the third and subsequent lines are in print-waiting states (print flag=0). When stop process 50f is started under such condition, the data in the third and subsequent lines with the "0" print flag are displayed on the display 27 (70a). Thus, correcting process 70b is effective for the third and subsequent lines.

According to the present embodiment, print-waiting data 41 can be corrected even during printing and operative efficiency is improved.

While in the present embodiment the data processor 10 is connected with the printer 11 through the data line 12, a similar print confirmation and correction system can be implemented in another data processor which has a built-in printer.

The present invention is applicable in an arrangement in which a plurality of data processors are connected to a single printer, an arrangement in which a single data processor is connected to a plurality of printers, or an arrangement in which a plurality of data processors are connected to a plurality of printers.

While in the present embodiment the data to be printed and the data to be displayed are separately provided, a similar print confirmation and correction system can be implemented also in an arrangement in which the data to be printed and displayed are provided in common to store in a display data storage such as a VRAM or a print data storage such as a printer buffer.

Figure 9:
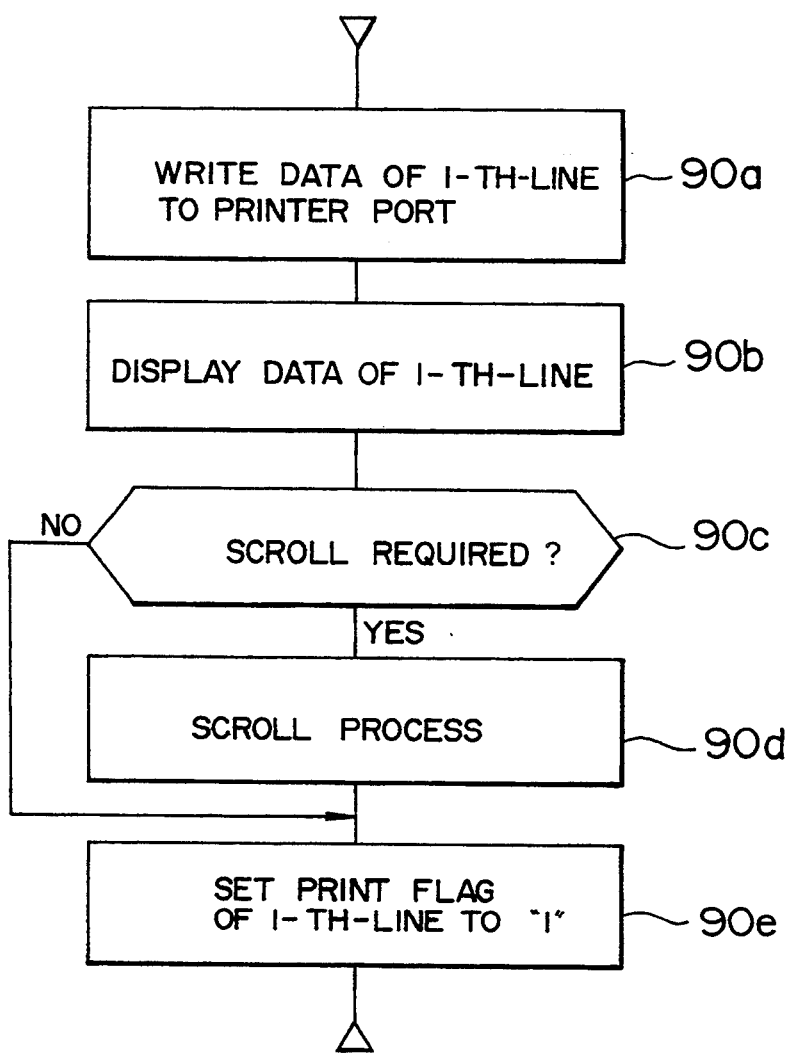
FIG. 9 illustrates a detailed flow of printing process 50d of FIG. 5 in the second embodiment.
Figure 10:
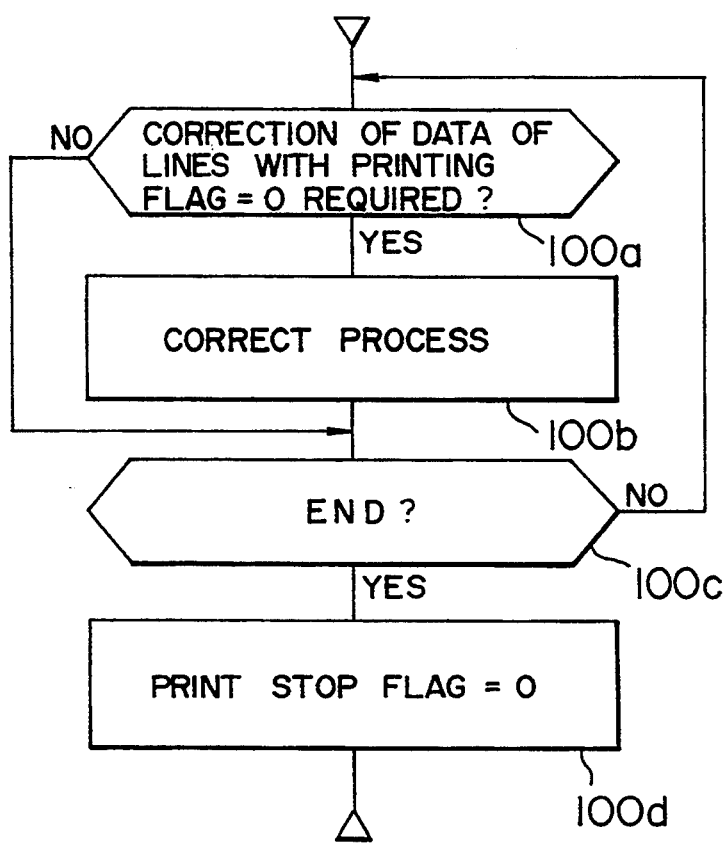
FIG. 10 illustrates a detailed flow of stop process 50f of FIG. 5 in the second embodiment.

A second embodiment of the present invention will be described with reference to FIGS. 9 and 10. The main flow of printing program is the same as that used in the first embodiment of FIG. 5 except for steps 50d and 50f. FIG. 9 shows the details of print process 50d of the main flow (FIG. 5) of the print program in the present embodiment. FIG. 10 shows the details of stop process 50f of the main flow (FIG. 5) of the print process in the present embodiment.

Referring to FIG. 9, first, print data of the object line 41 are output to the printer port 20 (90a). The data 41 are then displayed on the display 27 (90b). When the displayed data 41 increase in quantity and exceed a predetermined number of lines displayable on the display 27, a scroll process is performed to move the entire displayed data upwards in the screen of the display (90c, 90d). Then the print flag is set to "1" (completion of print) (90e).

Referring to FIG. 10, it is determined relying upon the print flag whether the object line relates to printed data or print-waiting data (100a). If the line relates to print-waiting data (print flag =0), correction is made (100b). If it relates to printed data (print flag=1), correction step 100b is not performed. It is then determined whether the stop process has completed (100c). If so, the print stop flag is set to "0" and the processing is terminated (100d).

According to the present embodiment, the print data are displayed synchronously with progression of the printing. Thus, the current point of printing is displayed at all times and the part of print-waiting data may be easily confirmed, then convenience of use is improved.

While in the above embodiment the same data as the printed data are displayed at step 90b and the display completely synchronizes to the printing, a delayed or advanced synchronization may be taken in which data under printing and data under display deviate by a predetermined quantity from each other by changing system to display the lines from i through (i−X) or (i+X) (X is any integer). The above synchronization makes the data displayed earlier or later than the data under printing by the predetermined quantity to thereby ensure some leeway for confirming print-waiting data and hence to improve the convenience of use.

Figure 11:
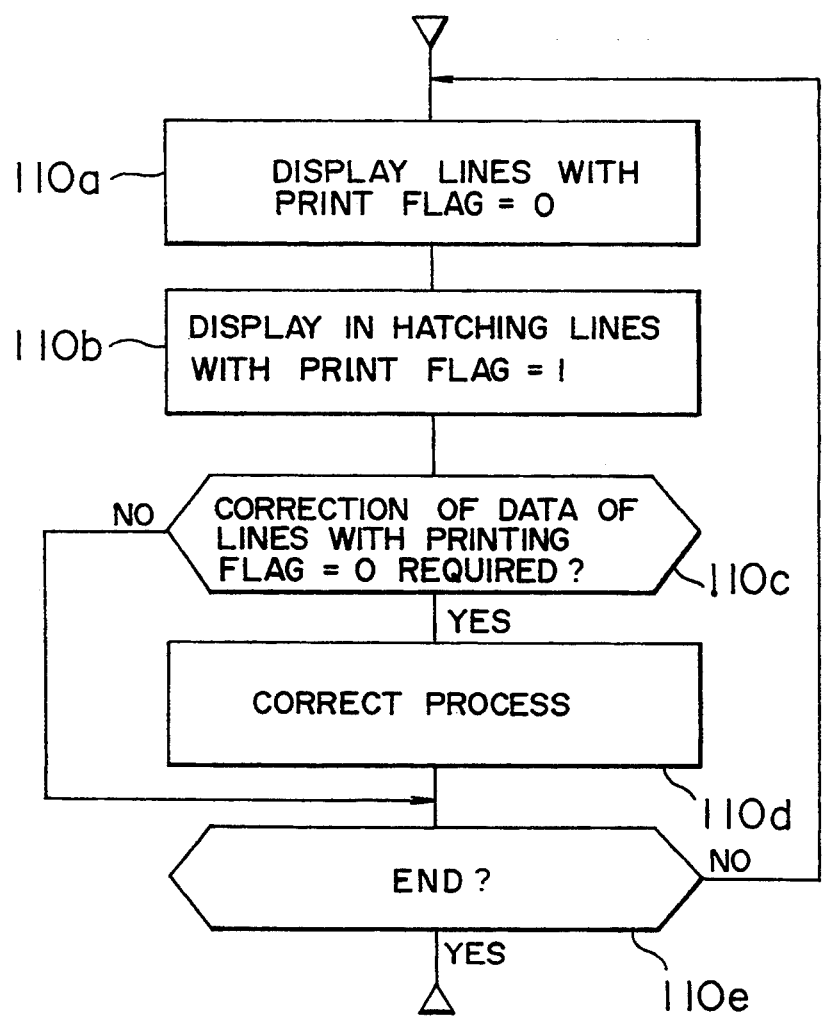
FIG. 11 illustrates a detailed flow of stop process 50f of FIG. 5 in the third embodiment.

A third embodiment of the present invention will be described with reference to FIG. 11. The main flow of the printing program is the same as the first embodiment shown in FIG. 5 except for step 50f. FIG. 11 shows the details of stop process 50f of the printing program of the present embodiment. Referring to FIG. 5, when stop process 50f starts in accordance with a user's request for stopping the printing, the print-waiting data are displayed in the display. The already printed data are further displayed with hatching. It is then determined whether the data for the line to be corrected are print-waiting data. If the data are print-waiting data (print flag=0), the correcting process program starts (100d). It is then determined whether the print stop process is terminated (110e). FIG. 19 shows one example of display of print data displayed on the screen of the display 27 in which both the printed data and print-waiting data are displayed. The already printed data are displayed in hatching, and the user may correct the data except the hatched data by a conventional operation. According to the present embodiment, since the printed data is displayed in hatching, the user can easily discriminate between the printed data and print-waiting data.

While in the present embodiment the printed data are identified by the hatching display, they may be identified by font or displayed color. If the quantity of printed data increases, a scroll process similar to the second embodiment may be used additionally.

Figure 12:
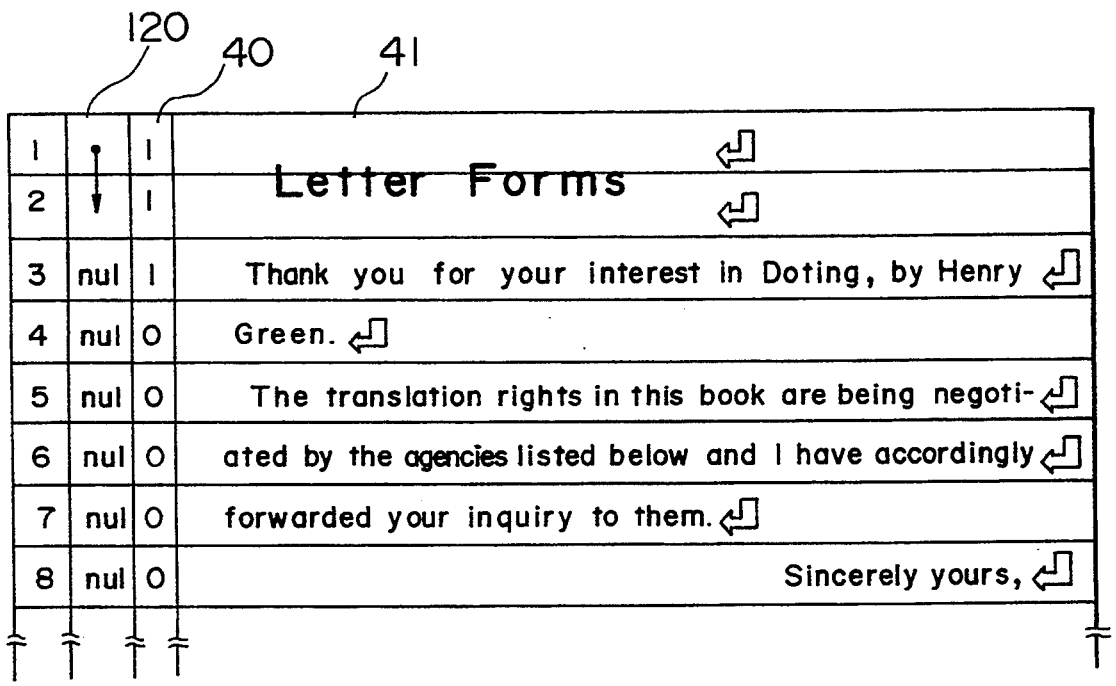
FIG. 12 shows another example of print data handled in the present invention.

A fourth embodiment of the present invention will be described with reference to FIGS. 12 and 13. FIG. 12 shows data to be printed and their control data to manage the former data. In FIG. 12, the numeral 40 denotes a print flag which stores information whether the print data are printed data ("1") or print-waiting data ("0"); 41, data to be printed; and 120, link data indicative that a plurality of data to be printed 41 are associated with each other. The print flag 40 is stored in a print flag storage region which is a specified region in the memory 22 or the secondary storage 24. Data to be printed 41 is stored in the memory 22 or the secondary storage 24.

Figure 13:
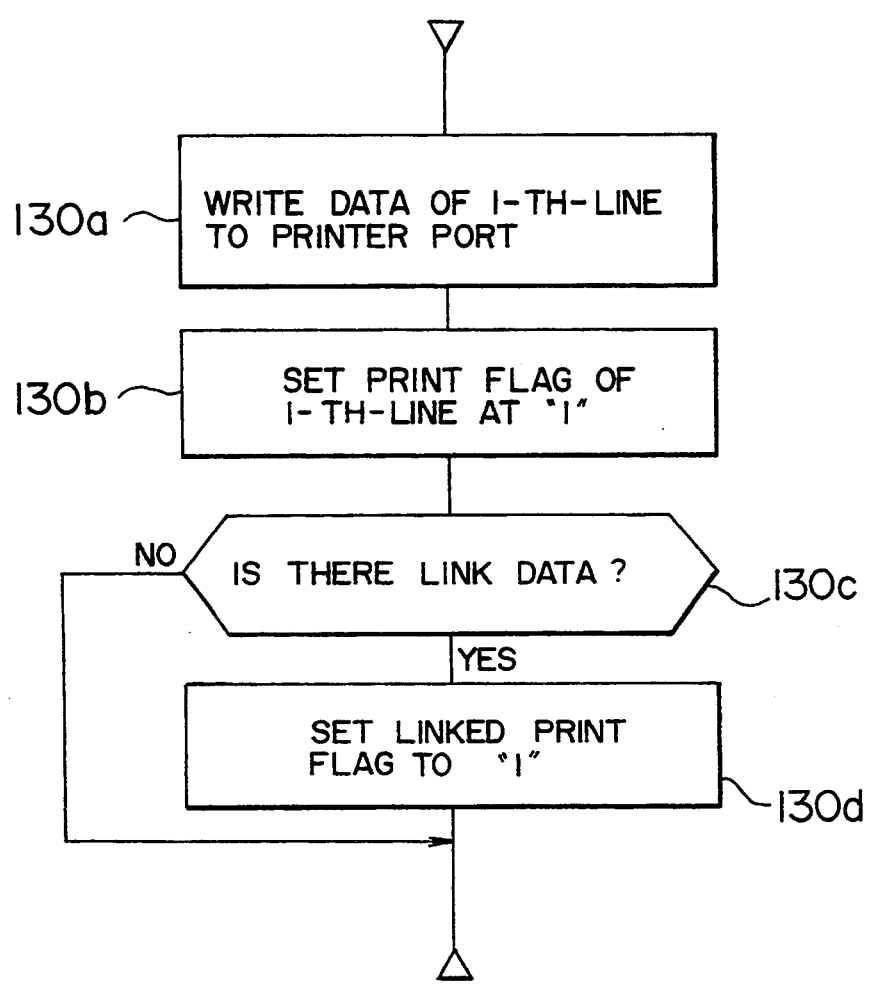
FIG. 13 shows a detailed flow of printing process 50d of FIG. 5 in the fourth embodiment.

FIG. 13 shows the details of printing process 50d. The main flow of the printing program is the same as that of the first embodiment of FIG. 5 except for steps 50d and 50f. The operation of the present embodiment will be described with reference to FIG. 13. When print starts, variables are initialized at steps 50a, 50d, and 50c and data on the line to be printed are written into the printer port (130a). A print flag corresponding to the data to be printed is set to "1" (completion of print) (130b). It is then determined whether the print data are associated with link data (130c). If so, the print flag of the linked print data is also set to "1" (completion of printing) (130d). Referring to FIG. 12, when print for the first line is performed, the print flag 40 for the first line is set to "1" and simultaneously, the print flag for the second line is also set to "1" in accordance with the link data for the first line. Thus, data to be printed involving a plurality of lines as double-sized characters in the first and second lines shown in FIG. 12, are corrected in a unit including a plurality of lines.

While in the present embodiment print data in one line are handled as a specified unit, other kind of unit as one character or one page may be employed.

Correction of print data to be printed through a plurality of lines such as double-sized characters or ruled lines is inhibited at the beginning of print on the head line to thereby avoid a trouble such as a deformation of the print data.

Figure 14:
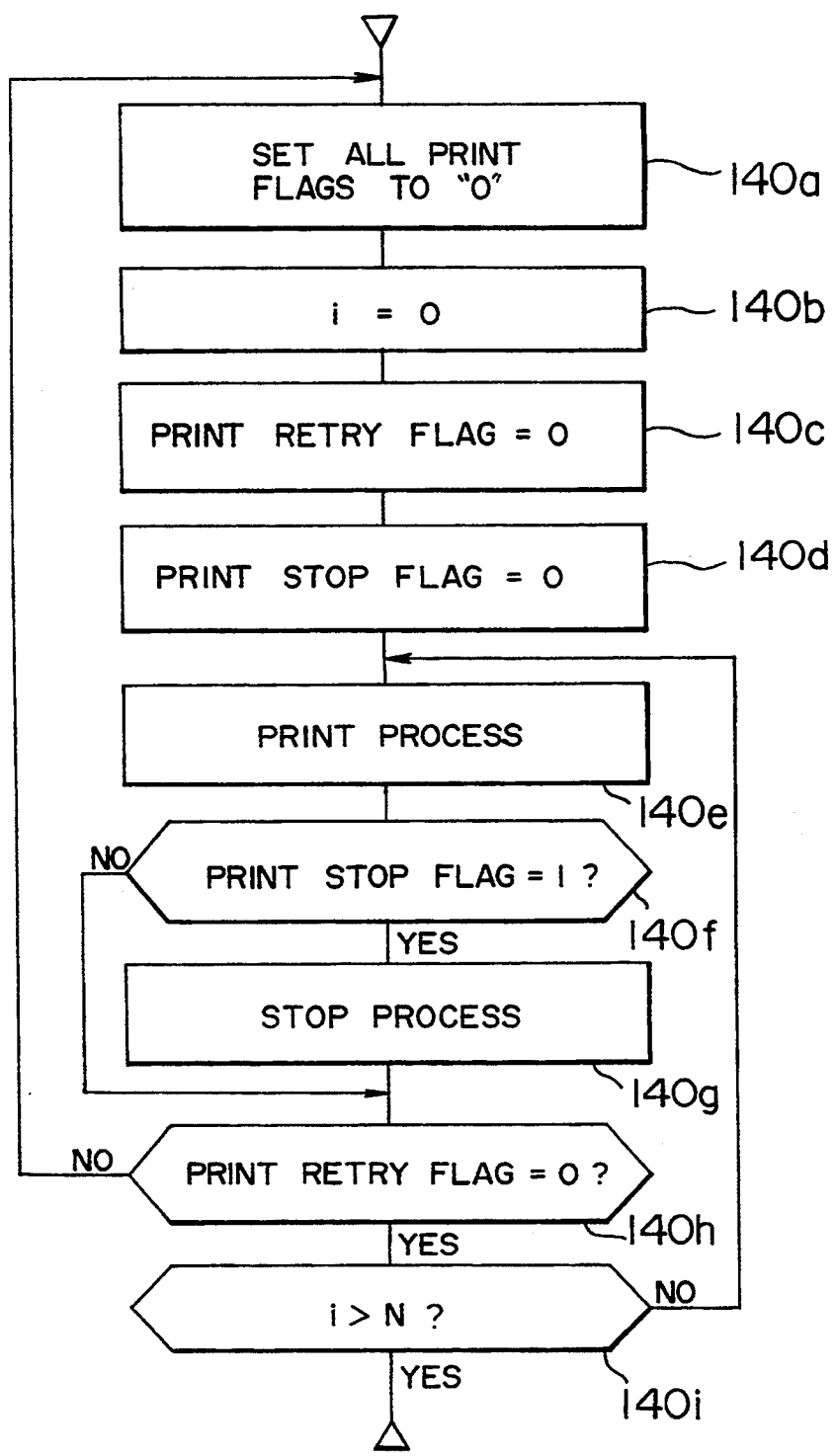
FIG. 14 shows a main flow of a printed data correcting method of the present invention executed by CPU 21 of FIG. 2 in the fifth embodiment.
Figure 15:
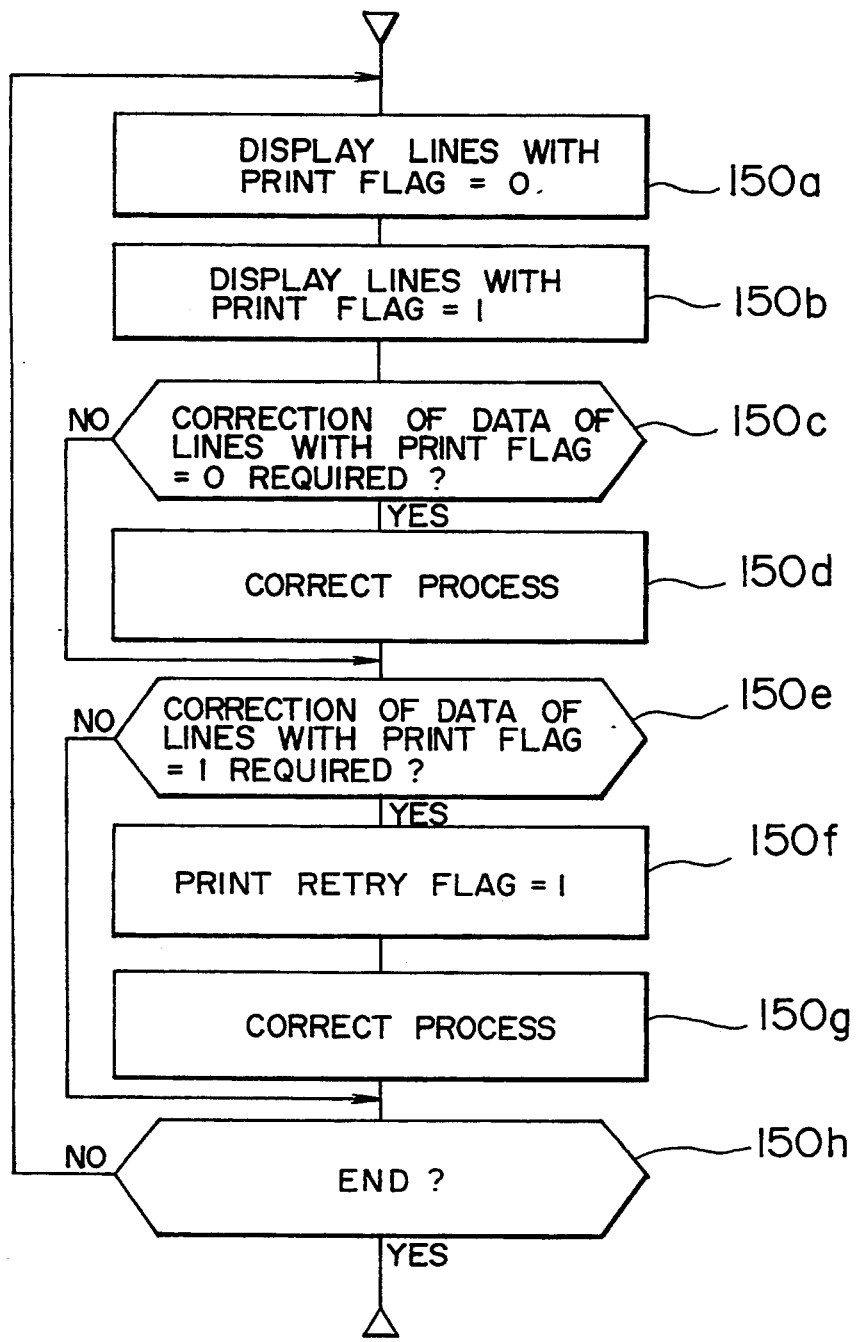
FIG. 15 shows a detailed flow of stop process 50f of FIG. 14.

A fifth embodiment of the present invention will described with reference to FIG. 14, which shows the main flow of the printing program. FIG. 15 shows a flow diagram indicative of the details of the stop process of the main program.

The operation of the method of the present invention will be described with reference to FIGS. 14 and 15. Initialization for printing is first performed at steps 140a, 140b, 140c and 140d as in the first embodiment (FIG. 5). Print is then performed line by line (140e). It is then determined whether stop process is requested (140f). If the stop process is required, the process is performed (140g). It is determined whether any printed datum is corrected in the stop process (140h). If so, all the printed data are reprinted. If no printed datum is corrected, the control advances to step 140i where it is then determined whether printing has ended. If not, the control returns to step 140e (140i). FIG. 15 shows a flow diagram of the details of the stop process at step 140g. Both the printed data and print-waiting data are first displayed (150a, 150b). It is then determined whether the data to be corrected are in the print-waiting data (150c). If so, the data are corrected (150d). Then, it is determined whether the data to be corrected are in the already printed data (print flag=1) (150e). If so, a print retry flag is set to "1" and then the data are corrected. It is then determined whether correction has ended (150h).

According to the present embodiment, print may take place on all the printed data and the print-waiting data, and only when the printed data has been corrected, the printed data is reprinted. Thus, paper resources are effectively used.

In the present embodiment, when any part of the already printed data is corrected, all the printed data is reprinted, but print may be performed only on the part of the printed data that requires reprinting.

Figure 16:
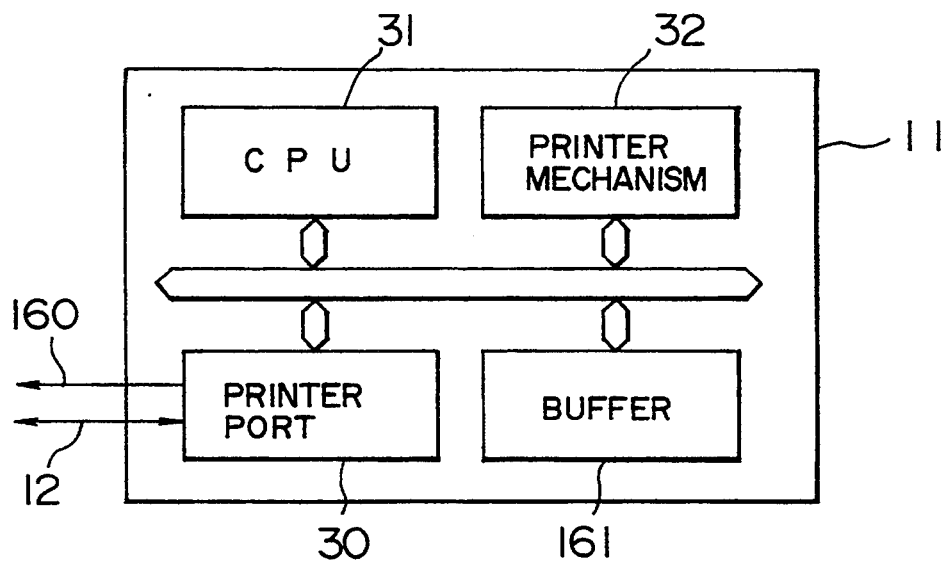
FIG. 16 shows a detailed structure of the printer 11 of FIG. 1 which has a built-in buffer.
Figure 17:
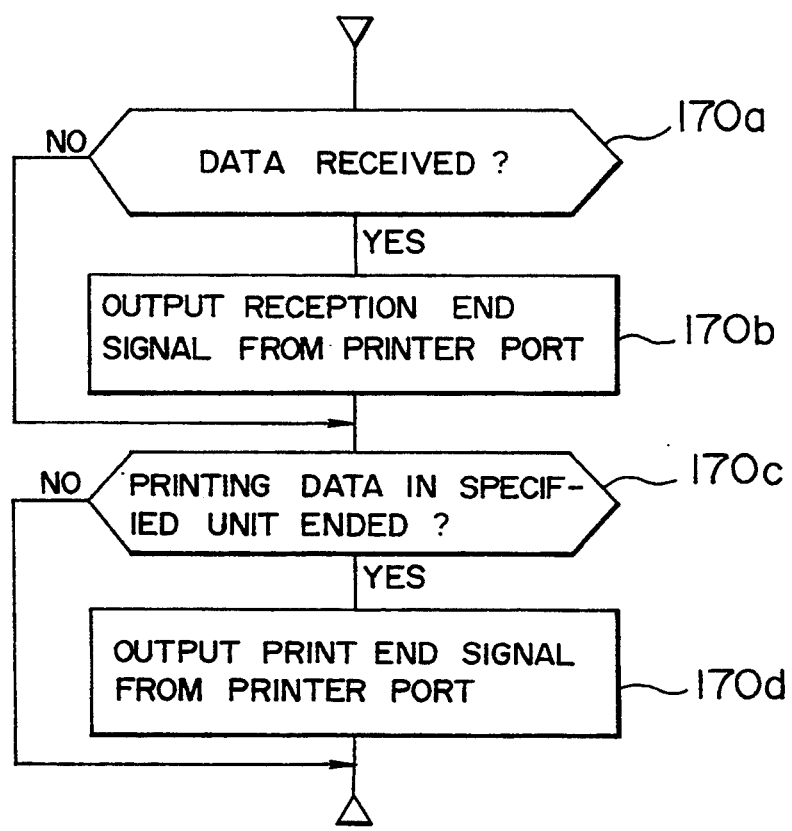
FIG. 17 shows a flow of processing executed by CPU 31 of FIG. 16.

Another embodiment of the present invention applied to a printer having a built-in buffer will be described with reference to FIGS. 16 and 17. FIG. 16 is a schematic of the printer. FIG. 17 is a flow chart indicative of the printer operation.

In FIG. 16, the numeral 30 denotes a printer port which controls the reception of print data delivered by the data processor 10; 31, a CPU which controls the entire printer 11; 32, a printer mechanism which prints data and feeds paper; 161, a buffer which temporarily stores print data received through the printer port; and 160, a print end signal line through which the printer informs the data processor 10 of the end of printing.

When data to be printed and delivered by the data processor are received through the printer port 30, the data are transferred to the buffer 161 under control of the CPU 31. The data transferred to buffer 161 are printed by the printer mechanism 32 under control of the CPU 31. Writing the data into the buffer and printing the data by the printer mechanism are performed in parallel, and the data to be printed can be received using idle times during printing. The operation of the printer 11 will be described with reference to FIG. 17. It is first determined whether the data to be printed are received through the printer port (170a). If so, a reception end signal indicative of the completion of reception is delivered through the data transmission line 12 (170b) to the data processor 10. It is then determined whether print in a specified unit such as in a one-line unit has ended (170c). If so, a print end signal is delivered through the print end signal line 160 (170d) indicative of the completion of print to the data processor 10.

Thus, the print situation can be confirmed also in such a printer that has a memory such as a buffer which temporarily stores the data to be printed and in which the actual print timing is delayed relative to the timing of reception of the data to be printed.

We claim:

1. A print data correcting method in a document editing and printing system in which a document is edited by a data processor with a display, a result of editing is output as a print job containing document data which is to be printed from said data processor to a printer, and said document data of said print job is printed by said printer, comprising the steps of:
    inputting and editing said document data by operating said data processor by a user;
    outputting inputted and edited said document data from said data processor to said printer as an invoked print job and causing said printer to start to print said document data of said invoked print job;
    storing in said data processor control data indicative of printed document data portions of said invoked print job which are already printed and waiting document data portions of said invoked print job which are print-waiting;
    displaying at least said waiting document data portions of said invoked print job on said display;
    allowing said user to operate said data processor to correct at least said waiting document data portions of said invoked print job to produce corrected document data;
    outputting said corrected document data from said data processor to said printer as corrected document data portions for said invoked print job; and
    causing said printer to continue to print said document data of said invoked print job, including said corrected document data portions such that a printed document data from said invoked print job incorporates said corrected document data.

2. A print data correcting method according to claim 1, further comprising the steps of:
    allowing said user to operate said data processor to stop printing of said invoked print job by said printer after printing has started; and
    restarting print of said invoked print job after said outputting of said corrected document data.

3. A print data correcting method according to claim 1, wherein:
    outputting of said invoked print job from said data processor to said printer is performed according to said document data being divided into print blocks of predetermined size; and
    said step of storing said control data indicative of printed document data portions and waiting document data portions is performed by storing said print blocks with print flags indicative of whether said print blocks are already printed or print-waiting.

4. A print data correcting method according to claim 3, wherein:
    each time when said print blocks are output to said printer, said displaying of at least said waiting document data portions is updated to display a predetermined range of said document data as referenced from a document data point of said output.

5. A print data correcting method according to claim 4, wherein:
    when a number of lines of a displayed at least said waiting document data portions exceeds a predetermined number, a display of at least said waiting document data portions is scrolled.

6. A print data correcting method according to claim 4, wherein:
    display of said document data is displayed distinctively with respect to at least one of said printed document data portions and said waiting document data portions.

7. A print data correcting method according to claim 3, wherein:
    said predetermined size of said print blocks corresponds in size to a line of said document data printed on a paper medium.

8. A print data correcting method according to claim 3, further comprising the steps of:
    storing link data indicating linkage of a selected one of said print blocks with a different selected one of said print blocks, for which said selected one and said different selected one are required to be printed together; and
    setting a print flag of said different selected one of said print blocks to a predetermined value when a print flag of a linked said selected one of said print blocks is set to indicate one of a completion of printing and outputting to said printer.

9. A print data correcting method according to claim 3, further comprising the steps of:
    outputting a signal indicative of completion of reception to said data processor when said printer receives said print blocks.

10. A print data correcting method according to claim 3, further comprising the steps of:
    outputting a signal indicative of completion of a printing operation to said data processor when said printer has printed said print blocks.

11. A print data correcting method in a document editing and printing system in which a document is edited by a data processor with a display, a result of editing is output as a print job containing document data which is to be printed from said data processor to a printer, and said document data of said print job is printed by said printer, comprising the steps of:
    inputting and editing said document data by an operation of said data processor by a user;
    outputting inputted and edited said document data from said data processor to said printer as an invoked print job and causing said printer to start to print said document data of said invoked print job;
    storing in said data processor control data indicative of printed document data portions of said invoked print job which are already printed and waiting document data portions of said invoked print job which are print-waiting;
    displaying said printed document data portions which are already printed and said waiting document data portions which are print-waiting on said display;

allowing said user to operate said data processor to correct said printed document data portions of said invoked print job and said waiting document data portions of said invoked print job; and only when said waiting document data portions are corrected, sequentially outputting corrected document data as corrected document data portions for said invoked print job, and when said printed document data portions are corrected, outputting corrected document data as further corrected document data portions of said invoked print job corresponding to a page of said document data which has been corrected; and causing said printer to continue to print said document data of said invoked print job, including said corrected document data portions such that a printed document data from said invoked print job incorporates said corrected document data.

12. A print data correcting method according to claim 11, further comprising the steps of:

allowing said user to operate said data processor to stop printing of said invoked print job by said printer after printing has started; and restarting print of said invoked print job after outputting of said corrected document data.

13. A print data correcting method according to claim 11, wherein:

outputting of said invoked print job from said data processor to said printer is performed according to said document data being divided into print blocks of predetermined size; and said step of storing said control data indicative of printed document data portions and writing document data portions is performed by storing said print blocks with print flags indicative of whether said print blocks are already printed or print-waiting.

14. A print data correcting method according to claim 13, wherein:

display of said document data is displayed distinctively with respect to at least one of said printed document data portions and said waiting document data portions.

15. A print data correcting method according to claim 13, further comprising the steps of:

outputting a signal indicative of completion of reception to said data processor, when said printer receives said print blocks.

16. A print data correcting method according to claim 13, further comprising the steps of:

outputting a signal indicative of completion of a printing operation to said data processor when said printer has printed said print blocks.

17. A document editing and printing system for printing a print job while allowing editing of said print job during a printing operation, said system comprising:

a storage means having at least a storage region for storing an invoked print job having document data in document data blocks of a specified size, and a first identifier for each respective document data block indicative of whether said respective document data block has been printed or is print-waiting;

an inputting means for allowing a user to input document data into said system;

a displaying means for displaying said document data of said invoked print job;

a printing means for printing said document data of said invoked print job; and a central processing unit including:

an edit means for editing document data of said invoked print job on a basis of input from said inputting means and storing edited document data into said storage means for said invoked print job;

a print control means, receiving said document data blocks of edited document data from said storage means, for sending said document data blocks of said edited document data for said invoked print job to said printing means, and setting said first identifier with respect to sent said document data blocks to indicate said sent document data blocks of said invoked print job as having been printed; and an edit control means for displaying at least print-waiting document data of said invoked print job according to said first identifiers and storing said edited document data of said invoked print job in said storage means after correcting said document data;

wherein said system causes said printing means to print said document data of said invoked print job, including corrected document data portions such that a printed document data from said invoked print job incorporates said corrected document data.

18. A document editing and printing system according to claim 17, wherein:

said storage means further includes a region for storing a second identifier indicative of whether input is received from said inputting means; and said central processing unit monitors said second identifier, stops said print control means when said second identifier indicates any input is received by said inputting means, and starts Operation of said edit control means.

19. A document editing and printing system for printing a print job while allowing editing of said print job during a printing operation, said system comprising:

a storage means having at least a storage region for storing document data of an invoked print job in document data blocks of a specified size, and a first identifier for each respective document data block indicative of whether said respective document data block has been printed or is print-waiting;

identifier means for setting said first identifiers according to whether said document data of said document data blocks are already printed or print-waiting, and third identifiers according to whether reprinting of corresponding document data portions of said invoked print job is required or not;

an inputting means for allowing a user to input document data into said system;

a displaying means for displaying said document data;

a printing means for printing said document data of said invoked print job; and a central processing unit including:

an edit means for editing document data on a basis of input from said inputting means and storing edited document data into said storage means;

a print control means, receiving said document data blocks of said edited document data from said storage means, for sending said document data blocks of said edited document data of said invoked print job to said printing means, and setting said first identifier with respect to sent said document data blocks to indicate said sent document data blocks of said invoked print job as having been printed;

an edit control means for displaying document data including print-waiting document data and printed document data of said invoked print job distinctively according to said first identifiers and storing said edited document data of said invoked print job in said storage means after correcting said document data, and for setting said third identifiers indicative of said document data of said invoked print job needing reprinting when printed document data are corrected; and a print monitor means for monitoring said third identifiers periodically, and driving said print control means to reprint said corrected document data when said third identifiers indicates a need of reprinting;

wherein said system causes said printing means to print said document data of said invoked print job, including corrected document data portions such that a printed document data from said invoked print job incorporates said corrected document data.

20. A document editing and printing system according to claim 19, wherein:

said storage means further includes a region for storing a second identifier indicative of whether input is received from said inputting means; and said central processing unit monitors said second identifier, stops said print control means when said second identifier indicates any input is received by said inputting means, and starts operation of said edit control means.

* * * * *